(12) United States Patent
Takahashi

(10) Patent No.: US 10,666,864 B2
(45) Date of Patent: May 26, 2020

(54) IMAGE CAPTURING APPARATUS AND CONTROL METHOD FOR IMAGE CAPTURING APPARATUS

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/215,361

(22) Filed: Dec. 10, 2018

(65) Prior Publication Data

US 2019/0182422 A1 Jun. 13, 2019

(30) Foreign Application Priority Data

Dec. 11, 2017 (JP) ................................. 2017-237200

(51) Int. Cl.
H04N 5/232 (2006.01)

(52) U.S. Cl.
CPC ..... *H04N 5/23238* (2013.01); *H04N 5/23219* (2013.01); *H04N 5/23222* (2013.01); *H04N 5/23245* (2013.01); *H04N 5/232941* (2018.08); *H04N 5/232945* (2018.08)

(58) Field of Classification Search
CPC ......... H04N 5/23238; H04N 5/232945; H04N 5/232941; H04N 5/23219; H04N 5/23222; H04N 5/23245

USPC ........................................................ 725/36
See application file for complete search history.

(56) References Cited

U.S. PATENT DOCUMENTS

2012/0169840 A1* 7/2012 Yamashita ............. H04N 5/232 348/36
2019/0104253 A1* 4/2019 Kawai ................ H04N 5/23238

FOREIGN PATENT DOCUMENTS

JP 201178132 a 4/2011

* cited by examiner

*Primary Examiner* — Nathan J Flynn
*Assistant Examiner* — Caroline Somera
(74) *Attorney, Agent, or Firm* — Canon U.S.A., Inc. IP Division

(57) ABSTRACT

An image capturing apparatus according to the present disclosure displays, on a display, a live view image captured by an image sensor and a guide indicating a predetermined area being an area within the live view image, being located at a position unrelated to an object included in the live view image, including no edge of the live view image, and being located within an area to be clipped from a first image to generate a panoramic image but excluding a joining portion of the area to be clipped. A first partial area including an entire area corresponding to the predetermined area in the first image among a plurality of images captured in a series of image capturing processes in panoramic image capturing is combined with a plurality of partial areas among the plurality of images other than the first image to generate the panoramic image.

19 Claims, 7 Drawing Sheets

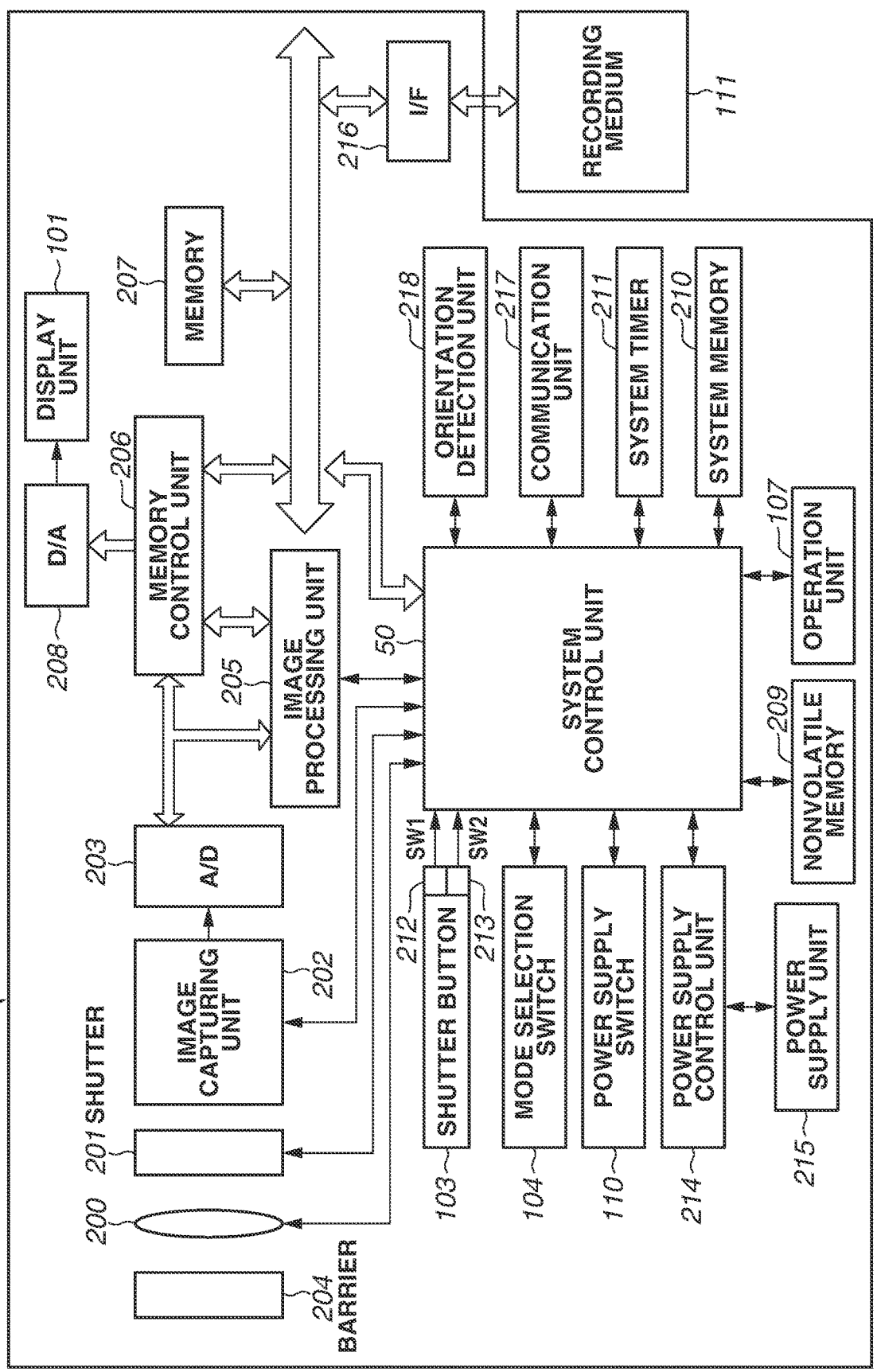

FIG.4

| OPERATION | a. LIVE VIEW IMAGE | b. CLIP IMAGE | c. COMBINE? | d. COMPOSITE IMAGE |
|---|---|---|---|---|
| 1. BEFORE IMAGE CAPTURING | 1a | 1b | 1c | 1d |
| 2. START IMAGE CAPTURING | 2a | 2b | 2c ○ | 2d |
| 3. PANNING RIGHTWARD | 3a | 3b | 3c ○ | 3d |
| 4. PANNING RIGHTWARD | 4a | 4b | 4c ○ | 4d |
| 5. PANNING RIGHTWARD | 5a | 5b | 5c ○ | 5d |
| 6. PANNING LEFTWARD | 6a | 6b | 6c × | 6d |
| 7. PANNING LEFTWARD | 7a | 7b | 7c × | 7d |
| 8. PANNING LEFTWARD | 8a | 8b | 8c × | 8d |
| 9. PANNING LEFTWARD | 9a | 9b | 9c ○ | 9d |
| 10. PANNING LEFTWARD | 10a | 10b | 10c ○ | 10d |
| 11. PANNING LEFTWARD | 11a | 11b | 11c ○ | 11d |
| 12. END | 12a BEING PROCESSED | 12b | 12c | 12d |

IMAGE CAPTURING APPARATUS AND CONTROL METHOD FOR IMAGE CAPTURING APPARATUS

BACKGROUND

Field of the Disclosure

The present disclosure relates to an image capturing apparatus and the like that can capture a panoramic image.

Description of the Related Art

In recent years, there is known an image capturing apparatus such as a digital camera and a smartphone that can continuously capture images while being swung, clip (cut out) a predetermined area (e.g., a strip-like area) from each of the captured images, and combine the clipped areas to generate a panoramic image (see Japanese Patent Application Laid-Open No. 2011-78132).

In a case where the image capturing apparatus discussed in Japanese Patent Application Laid-Open No. 2011-78132 captures a panoramic image including a human figure, for example, if an entire face of the human figure is not included within the area clipped from one image, partial images of the face that are clipped from a plurality of images are combined. However, since the images to be combined are each captured at different image capturing timings, partial images of the face with different facial expression are to be combined if the facial expression is changed during the image capturing process. In this case, there is a possibility that the face is not suitably captured in the panoramic image due to distortion in a joining portion between the partial areas of the face.

SUMMARY

The present disclosure is directed to more suitably capturing a panoramic image of a moving body in a case where panoramic image capturing is performed including a moving body such as a human figure in an object.

According to an aspect of the present disclosure, an image capturing apparatus includes an image sensor, and a memory and at least one processor to perform operations of the following units, i.e., a display control unit configured to control a display to display a live view image captured by the image sensor and a guide indicating a predetermined area being an area within the live view image, being located at a position unrelated to an object included in the live view image, including no edge of the live view image, and being located within an area to be clipped from a first image to generate a panoramic image but excluding a joining portion of the area to be clipped, and a control unit configured to perform control to combine a first partial area including an entire area corresponding to the predetermined area in the first image among a plurality of images captured in a series of image capturing processes in panoramic image capturing with a plurality of partial areas among the plurality of images other than the first image to generate the panoramic image.

Further features of the present disclosure will become apparent from the following description of exemplary embodiments with reference to the attached drawings.

BRIEF DESCRIPTION OF THE DRAWINGS

FIG. 2 is a diagram illustrating an example of an internal configuration of the camera.

FIG. 4 is a table illustrating an example of a panoramic image generation process in panoramic image capturing.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Exemplary embodiments of the present disclosure will be described below with reference to the drawings.

The present exemplary embodiment illustrates an example where a digital camera is used as an image capturing apparatus.

Figure 1A:
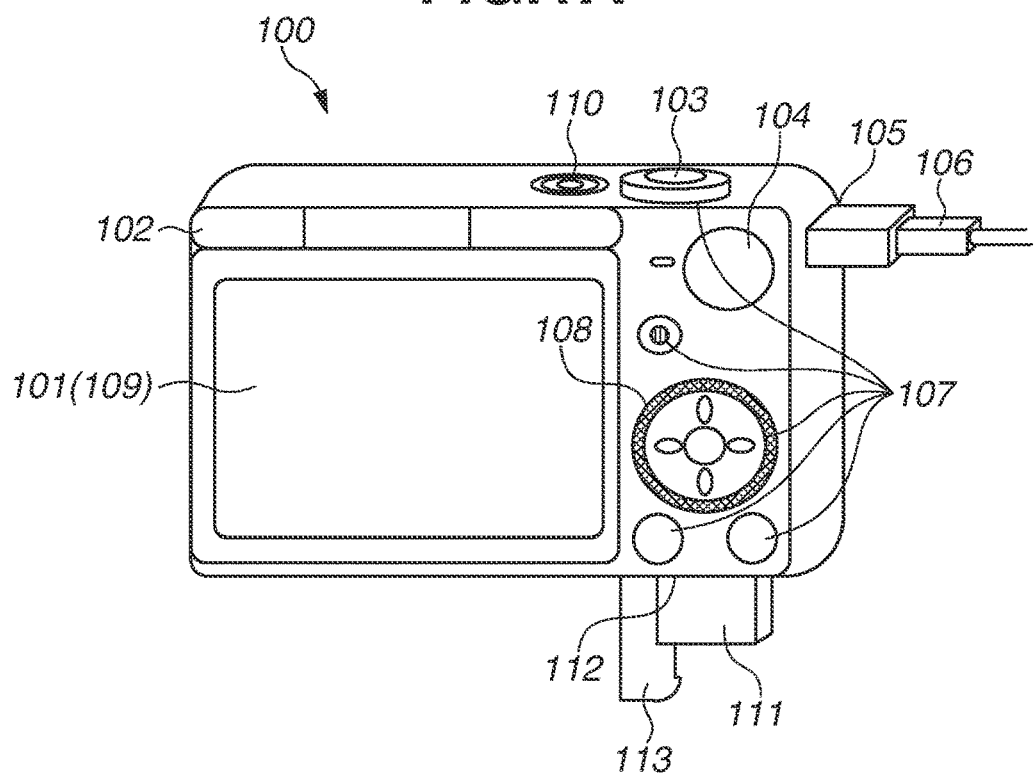
FIGS. 1A and 1B are views each illustrating an example of an external configuration of a camera.
Figure 1B:
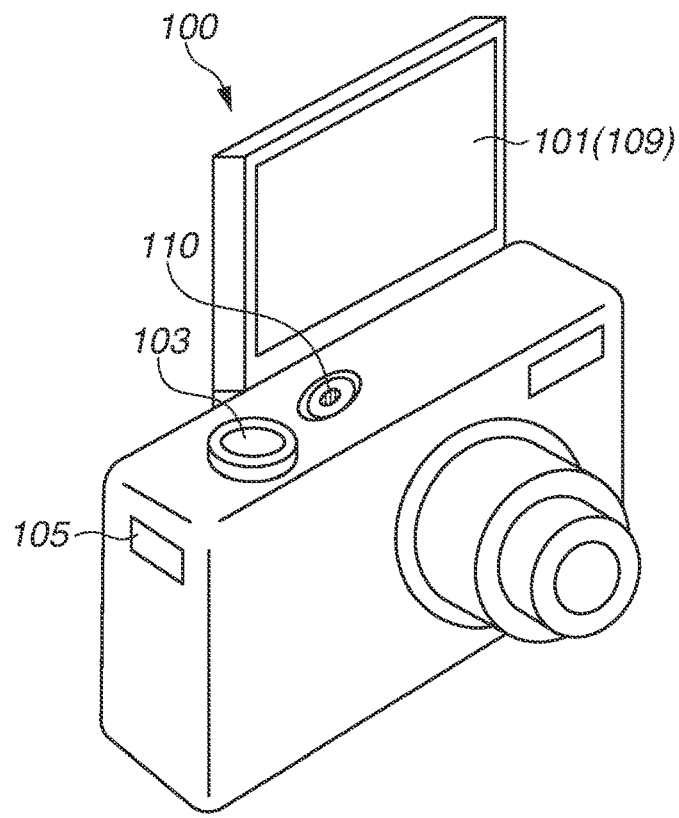

FIG. 1A is an external perspective view of a digital camera (hereinafter referred to as a camera) 100 as viewed from a back side thereof. FIG. 1B is an external perspective view of the camera 100 as viewed from a front side thereof.

A display unit 101 is configured to display an image and various information. The display unit 101 according to the present exemplary embodiment is a vari-angle monitor that can rotate about a hinge portion 102 and can change a position thereof relative to a camera body. The display unit 101 can be changed to at least one of a normal position (position illustrated in FIG. 1A) where a display surface faces the back side of the camera 100 and a facing position (position illustrated in FIG. 1B) where the display surface faces an object. By way of a switch portion disposed in the hinge portion 102, whether the display unit 101 is at the normal position or the facing position can be detected.

A shutter button 103 is an operation unit that allows a user to give an image capturing instruction. A mode selection switch 104 is an operation unit that allows the user to switch between various modes. A connector 105 is a connection portion through which a connection cable 106 is connected to an external apparatus such as a personal computer and a printer.

An operation unit 107 accepts various operations from the user. The operation unit 107 includes operation members such as various switches, buttons, a controller wheel 108, and a touch panel 109.

A power supply switch 110 is a push button for switching between power-on and power-off. A recording medium 111 is, for example, a memory card or a hard disk. A recording medium slot 112 stores the recording medium 111. The recording medium 111 plugged in the recording medium slot 112 can communicate with the camera 100, thereby enabling recording of image data and reproduction of image data. The recording medium slot 112 is closed with a lid 113. FIG. 1A illustrates a state where the lid 113 is opened and the recording medium 111 is partially taken out from the recording medium slot 112 to be exposed.

FIG. 2 is a diagram illustrating an internal configuration of the camera 100. Components identical to the components illustrated in FIG. 1 are denoted by the same reference numerals, and descriptions thereof are omitted as appropriate.

An imaging lens 200 is a lens group including a zoom lens and a focus lens. A shutter 201 has an aperture function. An image capturing unit 202 is an image sensor constituted of a charge-coupled device (CCD), a complementary metal oxide semiconductor (CMOS) element, or the like that converts an optical image into an electric signal. An analog-to-digital (A/D) converter 203 converts an analog signal output from the image capturing unit 202 into a digital signal. A barrier 204 covers the imaging lens 200 of the camera 100, thereby preventing an image capturing system including the imaging lens 200, the shutter 201, and the image capturing unit 202 from being contaminated or damaged.

An image processing unit 205 performs various types of image processing based on control performed by a system control unit 50. More specifically, the image processing unit 205 performs a predetermined pixel interpolation, resizing processing such as reduction, and color conversion processing on image data from the A/D converter 203 or image data from a memory control unit 206. Further, the image processing unit 205 performs predetermined calculation processing using captured image data. Based on an obtained calculation result, the system control unit 50 performs exposure control and ranging control. As a result, the image processing unit 205 performs autofocus (AF) processing, automatic exposure (AE) processing, and flash pre-emission (EF) processing of a through-the-lens (TTL) detection system. Furthermore, the image processing unit 205 performs predetermined calculation processing using the captured image data, and based on the obtained calculation result, also performs automatic white balance (AWB) processing of the TTL detection system.

The image data from the A/D converter 203 is written directly to a memory 207 via the image processing unit 205 and the memory control unit 206 or via the memory control unit 206. The memory 207 stores image data that is obtained by the image capturing unit 202 and converted into digital data by the A/D converter 203, and image data to be displayed on the display unit 101. The memory 207 has a sufficient storage capacity to store a predetermined number of still images and a predetermined time length of moving images and sounds. The memory 207 also serves as a memory for displaying images (video memory).

A digital-to-analog (D/A) converter 208 converts the image data for display stored in the memory 207 into an analog signal, and supplies the analog signal to the display unit 101. Accordingly, the image data for display written into the memory 207 is displayed by the display unit 101 via the D/A converter 208. The display unit 101 performs display on a display device such as a liquid crystal display (LCD) according to the analog signal supplied from the D/A converter 208. The digital signal, which is once A/D-converted by the A/D converter 203 and stored in the memory 207, is converted into an analog signal by the D/A converter 208, and is successively transferred to the display unit 101 so that a live view image can be displayed (through display), whereby the display unit 101 functions as an electronic viewfinder.

A nonvolatile memory 209 is a memory serving as an electrically erasable and recordable recording medium. For example, an electrically erasable programmable read-only memory (EEPROM) is used as the nonvolatile memory 209. The nonvolatile memory 209 stores a constant for operation of the system control unit 50, a program, and the like. The program is a computer program for executing various flowcharts described below according to the present exemplary embodiment.

The system control unit 50 includes at least one processor and/or circuit, and controls the entire camera 100. The system control unit 50 executes the program stored in the nonvolatile memory 209, thereby implementing each processing according to the present exemplary embodiment as described below. Further, the system control unit 50 also controls display by controlling the memory 207, the D/A converter 208, the display unit 101, and the like.

For example, a random access memory (RAM) is used as a system memory 210. A constant and a variable used for the operation of the system control unit 50, a program read from the nonvolatile memory 209, and the like are loaded into the system memory 210. A system timer 211 is a time measurement unit that measures the time used for various control operations, and the time of a built-in clock.

Each of the mode selection switch 104, a first shutter switch 212, a second shutter switch 213, and the operation unit 107 is an operation unit for inputting various operation instructions to the system control unit 50.

The mode selection switch 104 switches an operation mode to any one of a still image capturing mode, a moving image capturing mode, a reproduction mode, and the like. The system control unit 50 sets the operation mode switched by the mode selection switch 104. Examples of the modes included in the still image capturing mode are an automatic image capturing mode, an automatic scene determination mode, a manual mode, an aperture priority mode (Av mode), a shutter speed priority mode (Tv mode), and a panoramic image capturing mode. Further, the still image capturing mode also includes various scene modes that are image capturing settings for different image capturing scenes, a program AE mode, and a custom mode. Using the mode selection switch 104, a user can directly switch the image capturing mode to any one of the above-described modes. Alternatively, using the mode selection switch 104, the user can temporarily switch a screen to an image capturing mode list screen and can select any one of the plurality of displayed modes and switch to the mode using another operation member. The moving image capturing mode may include a plurality of modes.

The first shutter switch 212 is turned on when the shutter button 103 provided on the camera 100 is being operated to be a half-pressed state (image capturing preparation instruction), and generates a first shutter switch signal SW1. By the first shutter switch signal SW1, an operation such as autofocus (AF) processing, automatic exposure (AE) processing, automatic white balance (AWB) processing, or flash preliminary emission (EF) processing is started.

The second shutter switch 213 is turned on when the operation of the shutter button 103 is completed to be in a fully pressed state (image capturing instruction), and generates a second shutter switch signal SW2. By the second shutter switch signal SW2, the system control unit 50 starts operation of a series of image capturing processing which begins with reading of a signal from the image capturing unit 202 to writing of image data into the recording medium 111.

For example, by selecting and operating various function icons displayed on the display unit 101, each operation member of the operation unit 107 is appropriately assigned a function for each scene, and works as a function button. Examples of the function button are an end button, a return button, an image feed button, a jump button, a narrowingdown button, and an attribute change button. For example, when a menu button is pressed, a menu screen with various settable menus is displayed on the display unit 101. The user can intuitively make various settings using the menu screen displayed on the display unit 101, together with a four-direction button (up/down/right/left key) and a SET button.

The operation unit 107 includes the controller wheel 108. The controller wheel 108 is an operation member that can be rotatably operated and is used for, for example, instructing a selection item together with the up/down/right/left key.

When the controller wheel 108 is rotatably operated, an electric pulsed signal is generated according to an amount of operation. The system control unit 50 controls each unit of the camera 100 based on the generated pulsed signal. More specifically, the system control unit 50 can determine, for example, the angle and the number of rotations in the rotational operation of the controller wheel 108 based on the generated pulsed signal. As the controller wheel 108, any operation member that can detect a rotational operation may be used. For example, a dial operation member that generates a pulsed signal when the controller wheel 108 is rotated according to the rotational operation by the user may be used. Alternatively, the controller wheel 108 may be a so-called touch wheel that is an operation member constituted of a touch sensor that detects a rotational operation and the like of a finger of the user on the controller wheel 108, while the controller wheel 108 itself is not rotated.

The operation unit 107 also includes the touch panel 109. The touch panel 109 detects contact on the display unit 101. The touch panel 109 and the display unit 101 may be integrally formed. For example, the touch panel 109 is attached to an upper layer of a display surface of the display unit 101 so as to prevent a light transmission which hinders display of the display unit 101. Input coordinates on the touch panel 109 are associated with display coordinates on the display unit 101, thereby making a graphical user interface (GUI) that gives an impression that the user can directly operate the screen displayed on the display unit 101. Any type of touch panels may be used as the touch panel 109 such as a resistance film method, a capacitance method, a surface acoustic wave method, an infrared method, an electromagnetic induction method, an image recognition method, and an optical sensor method. These methods include a method of detecting a touch based on contact on the touch panel 109 and a method of detecting a touch based on an approach of a finger or a pen to the touch panel 109, and any of the methods may be used.

A power supply control unit 214 includes a battery detection circuit, a DC-DC converter, and a switch circuit for switching a block to be energized, and detects the presence or absence of a battery mounted, a type of the battery, and a remaining battery level. Further, the power supply control unit 214 controls the DC-DC converter based on the detection result and an instruction from the system control unit 50, and supplies a necessary voltage to the units including the recording medium 111 for a necessary period of time. A power supply unit 215 includes a primary battery such as an alkaline battery and a lithium battery, a secondary battery such as a NiCd battery, a NiMH battery, and a Li battery, and an AC adapter. A recording medium interface (I/F) 216 is configured to interface with the recording medium 111. The recording medium 111 includes a semiconductor memory, an optical disk, and a magnetic disk.

A communication unit 217 is connected to an external apparatus wirelessly or with a cable, and transmits and receives a video signal, an audio signal, and the like. The communication unit 217 is connectable to a wireless local area network (LAN) and the Internet. The communication unit 217 can transmit images (including a live view image) captured by the image capturing unit 202 and image data recorded on the recording medium 111, and can receive image data and various other information from an external apparatus.

An orientation detection unit 218 detects an orientation of the camera 100 relative to a gravitational direction. The system control unit 50 detects a swing direction of the camera 100 based on information about the orientation detected by the orientation detection unit 218. Further, based on the information about the orientation detected by the orientation detection unit 218, the system control unit 50 determines whether the image captured by the image capturing unit 202 is an image captured with the camera 100 held in a landscape orientation or in a portrait orientation. An acceleration sensor, a gyroscope sensor, and the like can be used as the orientation detection unit 218.

Figure 3:
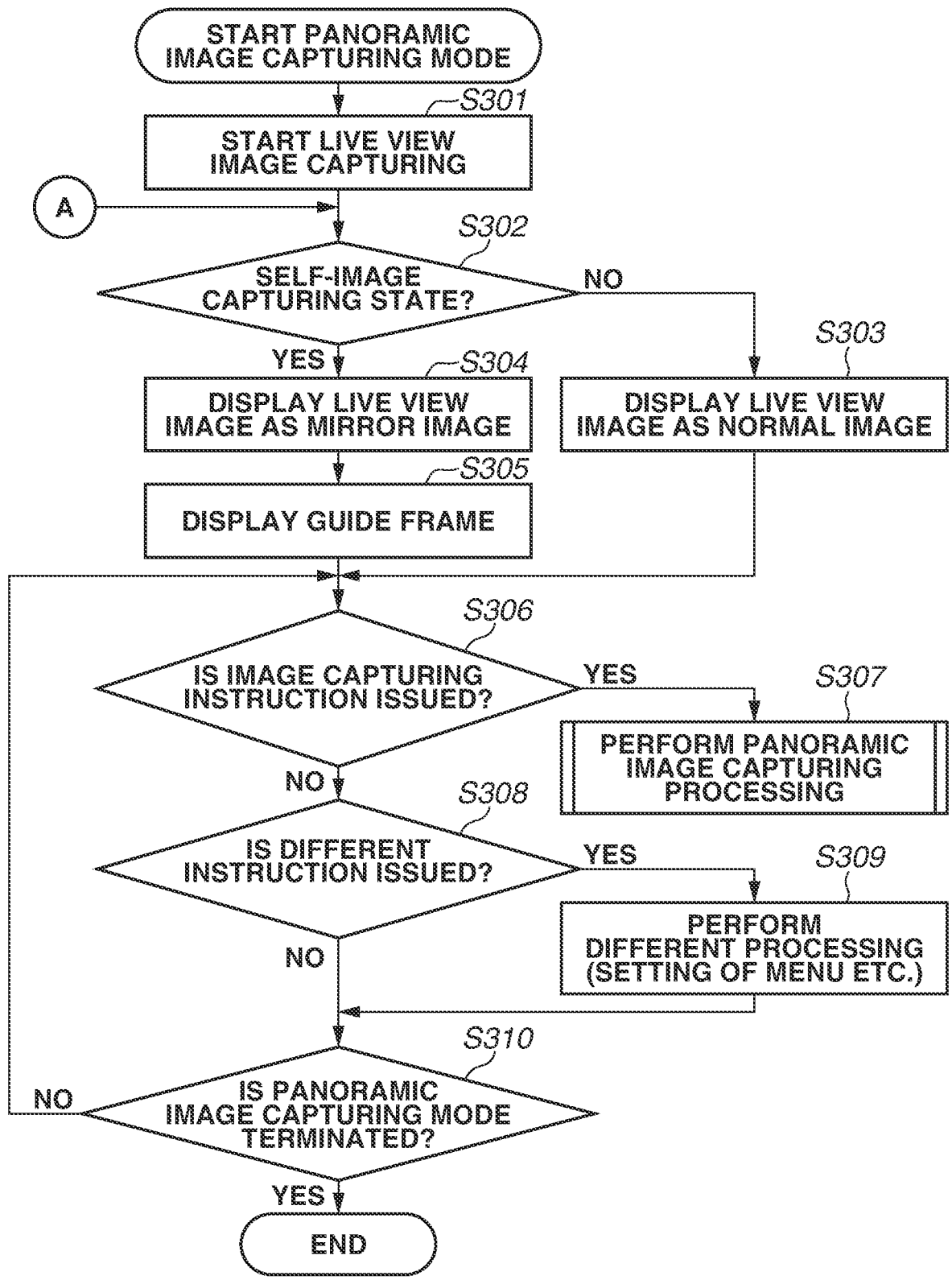
FIG. 3 is a flowchart illustrating an example of processing in a panoramic image capturing mode.

Next, processing performed by the camera 100 in the panoramic image capturing mode will be described with reference to a flowchart illustrated in FIG. 3. Each process in the flowchart illustrated in FIG. 3 is implemented in such a manner that the system control unit 50 loads a program stored in the nonvolatile memory 209 into the system memory 210 and executes the program. The flowchart illustrated in FIG. 3 is started when the camera 100 is activated in the image capturing mode and is set to the panoramic image capturing mode.

In step S301, the system control unit 50 starts live view image capturing by the image capturing unit 202.

In step S302, the system control unit 50 determines whether the camera 100 is in a self-image capturing state in which an image of the user (photographer) himself/herself is captured. For example, if the display unit 101 is located at the facing position where the display surface faces the user (photographer), the system control unit 50 determines that the camera 100 is in the self-image capturing state. Further, if the user selects the operation mode for self-image capturing, the system control unit 50 may determine that the camera 100 is in the self-image capturing state.

If it is determined that the camera 100 is in the self-image capturing state (YES in step S302), the processing proceeds to step S304. If it is determined that the camera 100 is not in the self-image capturing state (NO in step S302), the processing proceeds to step S303.

In step S303, the system control unit 50 displays a live view image as a normal image on the display unit 101, and the processing proceeds to step S306. More specifically, if the camera 100 is not in the self-image capturing state, processing of step S305 (display of a guide indicating a predetermined area) described below is basically omitted. The processing may proceed to step S306 after the system control unit 50 performs the processing of step S305 described below.

In step S304, since the camera 100 is in the self-image capturing state, the system control unit 50 converts the live view image into a mirror image and displays the mirror image on the display unit 101.

In step S305, the system control unit 50 displays a guide indicating a predetermined area superimposing on the live view image. The guide indicating the predetermined area is a guide for prompting the user to perform image capturing so that a human figure is included within the guide when the camera 100 is in an image capturing standby state in the panoramic image capturing mode. More specifically, the guide is a frame (hereinafter referred to as a guide frame). This guide is not displayed in an image capturing mode (e.g., the automatic image capturing mode, or the manual mode in which images are not combined to generate a panoramic image) other than the panoramic image capturing mode.

The guide frame will now be described.

FIG. 4 illustrates, in cells, live view images and the like displayed according to the image capturing operation performed by the user before starting panoramic image capturing until the end of panoramic capturing. In vertically arranged cells in an "OPERATION" column illustrated in FIG. 4, image capturing operations performed by the user are indicated in order from the top.

In vertically arranged cells in an "a. LIVE VIEW IMAGE" column in FIG. 4, examples of live view images displayed on the display unit 101 in response to the image capturing operation are indicated. In this case, live view images 1a to 12a are displayed in order from the top.

In vertically arranged cells in a "b. CLIPPED IMAGE" column illustrated in FIG. 4, examples of images clipped from the live view images are indicated. In this case, clipped images 1b to 12b are displayed in order from the top.

In vertically arranged cells in a "c. COMBINE?" column illustrated in FIG. 4, whether to combine clipped images is indicated. In the column, a "o" mark represents that the clipped images are combined and a "x" mark represents that the clipped images are not combined. In this case, the marks are denoted by reference symbols 1c to 12c in order from the top.

In vertically arranged cells in a "d. COMPOSITE IMAGE" column illustrated in FIG. 4, examples of images being combined are indicated. In this case, the images being combined are denoted by reference symbols $1_d$ to $12d$ in order from the top.

Figure 5:
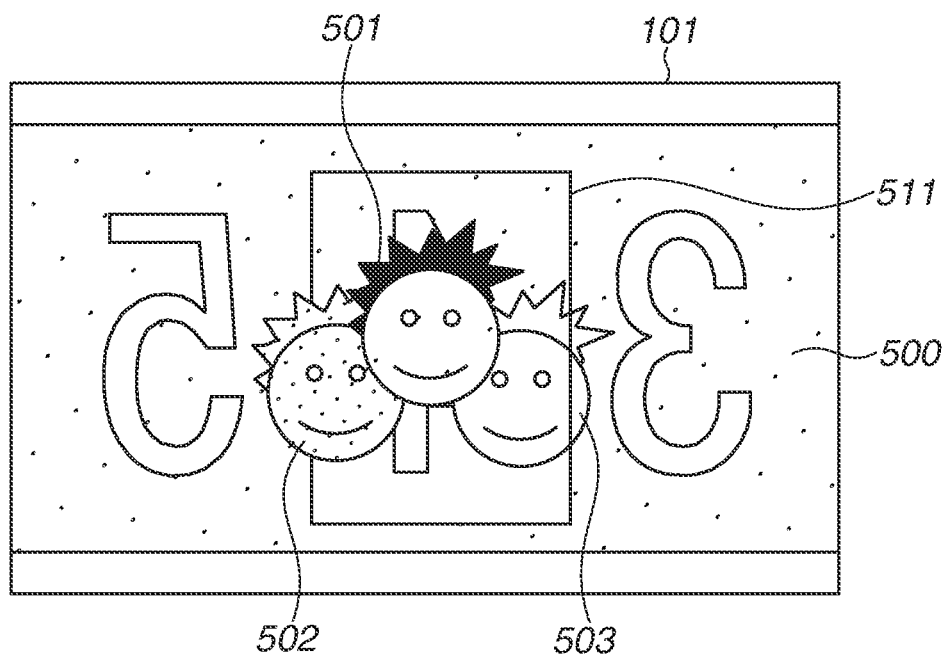
FIG. 5 is a diagram illustrating an example of a live view image at the start of image capturing.

FIG. 5 is an enlarged view illustrating the live view images 1a and 2a in "1. BEFORE IMAGE CAPTURING" or "2. START IMAGE CAPTURING" illustrated in FIG. 4. A live view image 500 illustrated in FIG. 5 includes human figures 501 to 503 and a background as a panoramic image capturing scene. The following description is given on an assumption that the human FIG. 501 is the user. However, any of the human FIGS. 501 to 503 may be a human figure captured as an object not as the user.

FIG. 5 illustrates a guide frame 511 indicating a range of a predetermined area at the center of the screen of the display unit 101. The position and size of the guide frame 511 are preliminarily stored in, for example, the nonvolatile memory 209. The guide frame 511 is a display item for guiding the user to perform image capturing so that a moving body such as a human figure, in particular, a face of the human figure, is included within the guide frame 511. The display mode of the guide frame 511 is not particularly limited thereto as long as the display enables the user to identify the predetermined area. The predetermined area may also be displayed in other display modes. For example, in an area other than the predetermined area, a translucent gray mask or the like may be displayed, hatching or monochrome display may be performed. Alternatively, marks may be displayed at four corners of the predetermined area. A message for promoting the user to perform image capturing so as to include an object, which is a moving body, within a frame such as "Please include your face within the frame when performing self-image capturing" may be displayed together with the display of the predetermined area such as the guide frame 511.

Referring back to FIG. 3, in step S306, the system control unit 50 determines whether the image capturing instruction is issued. More specifically, the system control unit 50 determines whether the shutter button 103 is fully-pressed by the user and the second shutter switch 213 is turned on. The image capturing instruction is not limited to an instruction issued through the shutter button 103, but may also be an instruction issued by the user through the touch panel 109.

The system control unit 50 performs panoramic image capturing processing in step S307 when the image capturing instruction is issued. The panoramic image capturing processing will be described below with reference to a flowchart illustrated in FIG. 6. On the other hand, if the image capturing instruction is not issued (NO in step S306), the processing proceeds to step S308.

In step S308, the system control unit 50 determines whether a different instruction is issued by the user, i.e., whether an operation other than the image capturing instruction in the panoramic image capturing mode is carried out. Examples of the operation other than the image capturing instruction include an operation for changing image capturing parameters (operation included in MENU, and operation for changing white balance or exposure correction). If the different instruction is issued (YES in step S308), the processing proceeds to step S309. If the different instruction is not issued (NO in step S308), the processing proceeds to step S310.

In step S309, the system control unit 50 performs processing according to the different instruction. Examples of the different instruction include adjustment of an image capturing parameter such as an image quality, the number of pixels, and a white balance, that is performed while a menu screen is displayed in response to a user operation. In this case, the user may preliminarily set whether to display the guide frame in the self-image capturing state in the panoramic image capturing mode. If a setting of not displaying the guide frame is made, the display of the guide frame in step S305 is not carried out.

In step S310, the system control unit 50 determines whether to terminate the panoramic image capturing mode. If the panoramic image capturing mode is terminated (YES in step S310), the processing in the flowchart illustrated in FIG. 3 ends. If the panoramic image capturing mode is not terminated (NO in step S310), the processing returns to step S306.

Next, the panoramic image capturing processing will be described with reference to the flowchart illustrated in FIG. 6.

Figure 6:
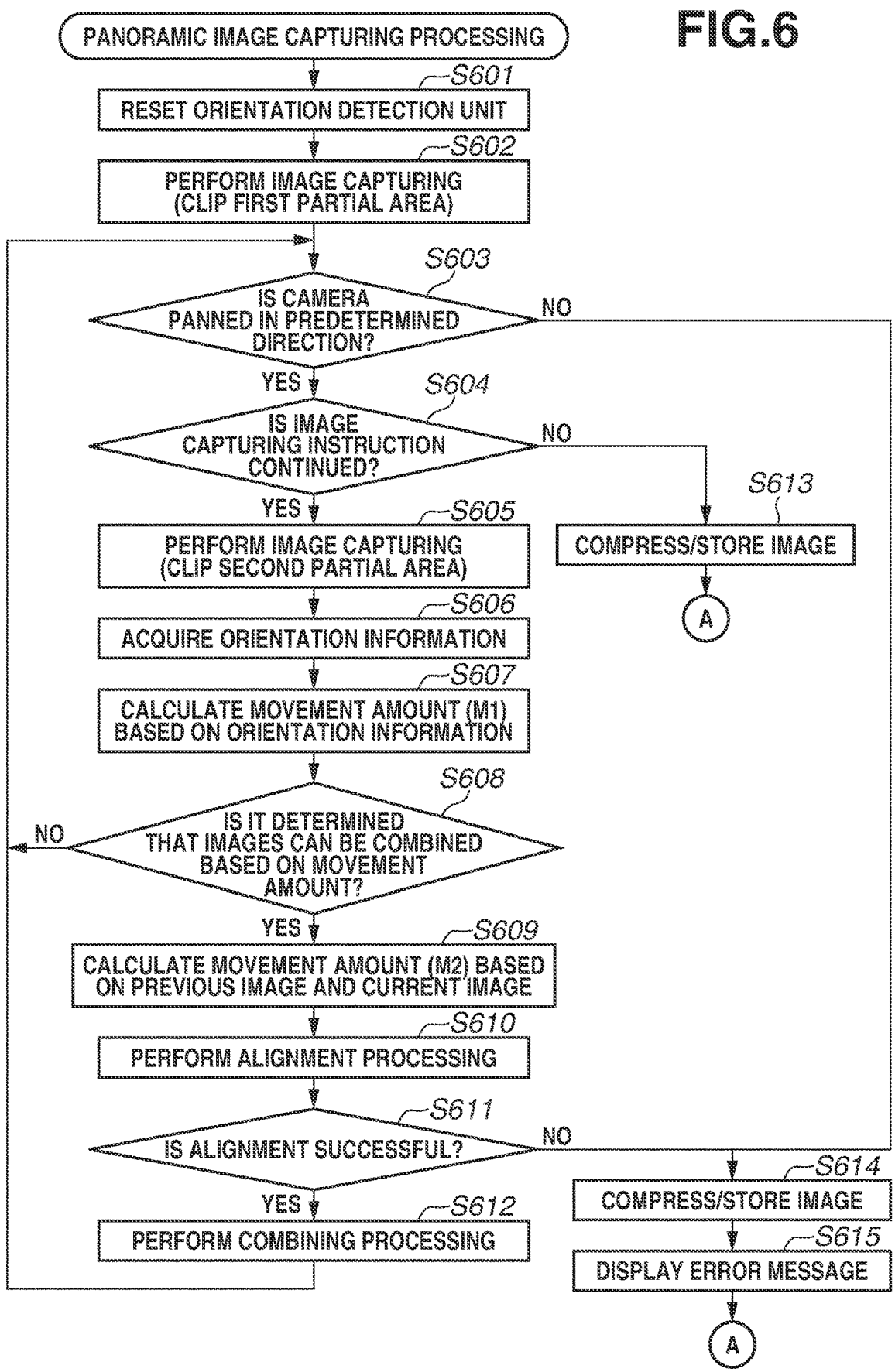
FIG. 6 is a flowchart illustrating an example of panoramic image capturing processing.

FIG. 6 is a flowchart illustrating an example of the panoramic image capturing processing. The flowchart illustrated in FIG. 6 is implemented in such a manner that the system control unit 50 loads a program stored in the nonvolatile memory 209 into the system memory 210 and executes the program.

In an image capturing method for panoramic image capturing according to the present exemplary embodiment, as illustrated in "OPERATION" in FIG. 4, the user first captures an image of the user himself/herself. Next, the user swings the camera 100 in a first direction until reaching an image capturing limit (end in the first direction). Then, the user swings the camera 100 in a second direction opposite (180° opposite) to the first direction until reaching an image capturing limit (end in the second direction). After that, image capturing is terminated. The camera 100 performs a series of image capturing processes in panoramic image capturing by continuously capturing images according to the above-described swing operation while the image capturing instruction is continued.

The following description is given on an assumption that the swing operation in the first direction corresponds to panning rightward and the swing operation in the second direction corresponds to panning leftward. In steps prior to step S306 described above, the camera 100 is in the standby state before image capturing. More specifically, this state corresponds to "1. BEFORE IMAGE CAPTURING" illustrated in FIG. 4, and the live view image 1a is displayed on the display unit 101 while the clipped image 1b is not present. Accordingly, the determination mark 1c whether to combine images is not made, and the composite image 1d is not present.

First, in step S601, the system control unit 50 resets the orientation detection unit 218 according to the image capturing instruction. The reset is performed so as to detect an amount of swing when the camera 100 is panned during a period from when a first image is captured to when a second image is captured (step S605 described below).

In step S602, the system control unit 50 captures the first image and clips (cuts out) a first partial area from the captured image. After capturing the first image, the system control unit 50 does not display the guide frame 511. Since the image captured in this case is the first image, the clipped image 2b and the composite image 2d illustrated in FIG. 4 are identical images. The system control unit 50 stores the clipped image of the first partial area in the memory 207. The first partial area is clipped from the first image when the guide frame is displayed in step S305. If the guide frame is not displayed, it is highly likely that a moving body such as the face of a human figure is not included within the guide frame, and thus a second partial area to be described below (i.e., an area narrower than the first partial area in a panning direction) is clipped from the first image. This is because, if the moving body is not included within the guide frame and it is less likely that the face or the like is distorted at a joining portion between images, finely clipped images as described below facilitates the alignment of images.

Figure 7A:
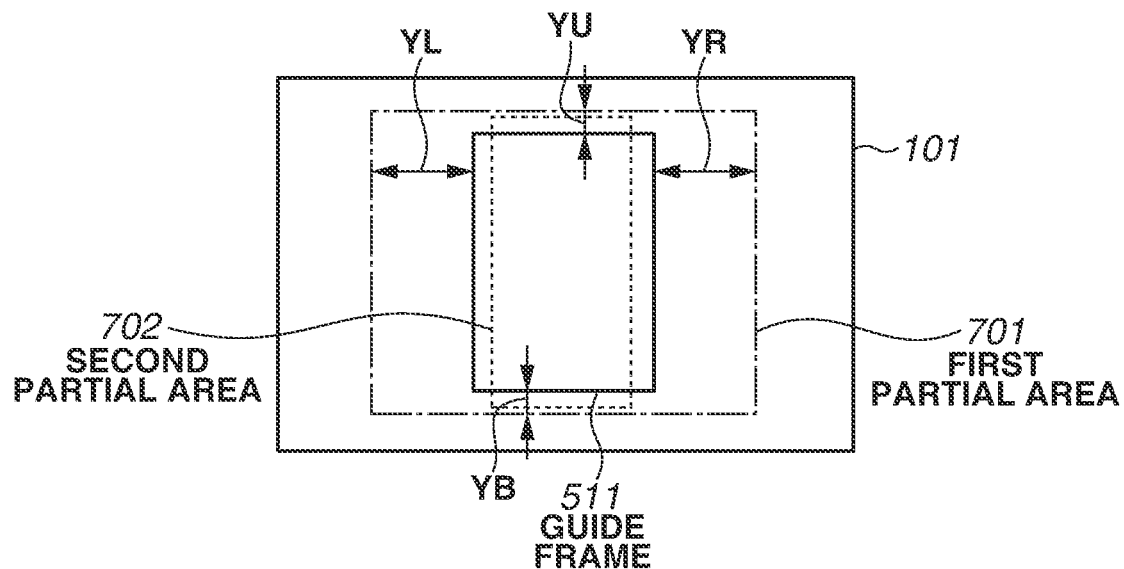
FIGS. 7A and 7B are diagrams illustrating examples of partial areas to be clipped from an image.

The guide frame and the first partial area will now be described with reference to FIG. 7A.

The guide frame 511, which is a frame for prompting the user to perform image capturing so that the face of a human figure is included within the guide frame as described above, is displayed in such a manner that the guide frame 511 is superimposed on a live view image so that the user can recognize the guide frame 511.

A first partial area 701 is a range that is clipped as an image to be used as a panoramic image when the first image is captured. The range of the first partial area 701 is not displayed on the display unit 101, so that the user cannot recognize the first partial area 701. The position and size of the first partial area 701 are set by the system control unit 50 based on the information that is preliminarily stored in the nonvolatile memory 209.

A second partial area 702 is a range that is clipped as an image to be used as a panoramic image when the second and subsequent images to be described below are captured. The range of the second partial area 702 is not displayed on the display unit 101, so that the user cannot recognize the second partial area 702. The position and size of the second partial area 702 are set by the system control unit 50 based on the information which is preliminarily stored in the nonvolatile memory 209.

A width (panning direction) and a height (direction perpendicular to the panning direction) of the guide frame 511 are respectively represented by (Wg, Hg). A width and a height of the first partial area 701 are respectively represented by (W1, H1), and a width and a height of the second partial area 702 are respectively represented by (W2, H2).

A blank width from a right edge in the width direction of the guide frame 511 to a right edge of the first partial area 701 is represented by YR. A blank width from a left edge in the width direction of the guide frame 511 to a left edge of the first partial area 701 is represented by YL. A blank width from an upper edge in the height direction of the guide frame 511 to an upper edge of the first partial area 701 is represented by YU. A blank width from a lower edge in the height direction of the guide frame 511 to a lower edge of the first partial area 701 is represented by YB. That is, relationships of W1=YL+Wg+YR and H1=YU+Hg+YB are obtained.

In the present exemplary embodiment, the first partial area 701 is set to be larger on both sides thereof in the swing direction than the area corresponding to the guide frame 511. More specifically, the width W1 of the first partial area 701 is larger than the width Wg of the guide frame 511 (W1>Wg).

A distance in the width direction from an edge of the guide frame 511 to an edge of the first partial area 701 is set to be longer than a distance in the height direction from an edge of the guide frame 511 to an edge of the first partial area 701. In other words, the value obtained by adding the blank width YL and the blank width YR in the width direction is greater than the value obtained by adding the blank width YU and the blank width YB in the height direction (YL+YR>YU+YB).

The first partial area 701 is set to be larger on both sides thereof in the width direction than the second partial area 702. More specifically, the width W1 of the first partial area 701 is larger than the width W2 of the second partial area 702 (W1>W2).

The relationship among the guide frame 511, the first partial area 701, and the second partial area 702 has been set as described above for reasons described below. The first partial area 701 and the predetermined area indicated by the guide frame 511 are different from an AF area indicated by an AF frame displayed in the automatic image capturing mode and the like. AF processing is also performed in the panoramic image capturing mode in which the first partial area 701 and the predetermined area are larger than the AF area (focus detection area used in AF processing) and the AF area is included in the first partial area 701 and the predetermined area.

Referring back to FIG. 6, in step S603, the system control unit 50 determines whether the camera 100 is panned in a predetermined direction, i.e., rightward in this case. More specifically, the system control unit 50 receives orientation information from the orientation detection unit 218, and determines whether the camera 100 is panned rightward based on the received orientation information. As illustrated in the live view image 3a in FIG. 4, the system control unit 50 may prompt the user to perform an operation by displaying the panning direction in a recognizable manner using a displayed icon of an arrow or the like.

After a rightward limit (live view image 5a illustrated in FIG. 4) is reached, the system control unit 50 determines whether the camera 100 is panned leftward that is a direction opposite to the rightward direction (live view images 6a to 11a illustrated in FIG. 4).

If it is determined that the camera 100 is panned in the predetermined direction (YES in step S603), the processing proceeds to step S604. If it is determined that the camera 100 is not panned in the predetermined direction (NO in step S603), the processing proceeds to step S614.

In step S604, the system control unit 50 determines whether the image capturing instruction is continued. More specifically, the system control unit 50 determines whether the image capturing instruction is continued based on the operation performed by the user through the second shutter switch 213, the touch panel 109, and the like. If it is determined that the image capturing instruction is continued (YES in step S604), the processing proceeds to step S605. If it is determined that the image capturing instruction is not continued (NO in step S604), the processing proceeds to step S613.

In step S605, the system control unit 50 captures the second and subsequent images and clips the second partial area 702 from each of the captured images. For example, the clipped image 3b illustrated in FIG. 4 is clipped. The system control unit 50 stores the clipped image of the second partial area 702 in the memory 207.

In step S606, the system control unit 50 acquires the orientation information from the orientation detection unit 218. For example, when a gyroscope sensor is used as the orientation detection unit 218, the system control unit 50 acquires biaxial gyroscope information in a yaw direction and a pitch direction of the camera 100 as the orientation information. Further, the system control unit 50 may also acquire triaxial gyroscope information including a roll direction that is a rotation about an optical axis. The gyroscope sensor outputs an angular velocity, but in panoramic image capturing, the amount of swing from the previous image capturing is required. Accordingly, the system control unit 50 integrates angular velocities from previous image capturing to current image capturing, thereby acquiring the rotation angle from the previous image capturing as the amount of swing during image capturing of the second and subsequent images.

In step S607, the system control unit 50 acquires a movement amount (M1) of panning from the previous image capturing to the current image capturing based on the orientation information. More specifically, the system control unit 50 converts the rotation angle into pixel units based on the focal length and angle of view of a lens, information about the image sensor, and the like.

In general, an angle of view (α) of a lens with no distortion or a lens after distortion thereof being corrected is calculated by Expression (1):

$$\alpha[°]=2\times\arctan(w[\text{mm}]\div 2\div f[\text{mm}]) \quad (1),$$

where an effective focal length is represented by f[mm], and a sensor width is represented by w[mm].

The movement amount M1[pix] in an image is calculated by Expression (2):

$$M1[\text{pix}]=\tan(\alpha[°]\div 2)\times f[\text{mm}]/p[\mu\text{m}]\times 1000 \quad (2),$$

where the size per pixel of the sensor is represented by p[μm], and the rotation angle[°] is represented by θ.

In step S608, the system control unit 50 determines whether images can be combined. More specifically, the system control unit 50 compares the movement amount M1 with the width of the partial area to determine whether images can be combined.

A case where the camera 100 is panned rightward after capturing the first image to capture the second image is taken as an example. In this case, the system control unit 50 determines whether the image of the second partial area 702 of the second image exceeds the width W1 of the first partial area 701 of the first image based on the movement amount M1. If the system control unit 50 is determines that the image of the second partial area 702 of the second image exceeds the width W1 of the first partial area 701 of the first image, it is determined that the images can be combined. Since the clipped image 3b illustrated in FIG. 4 exceeds the width of the clipped image 2b, it is determined that images can be combined. Accordingly, "○" is illustrated in the cell 3c to indicate that images are combined. Similarly, for a third image, the system control unit 50 determines whether the image of the second partial area 702 of the third image exceeds the width W2 of the second partial area 702 of the second image based on the movement amount. A case is cited where the camera 100 is panned leftward after the camera 100 is panned rightward and has reached the limit (live view image 6a and subsequent images illustrated in FIG. 4). In this case, in a part of leftward panning process, a clipped image does not exceed the area captured during the rightward panning, i.e., the first partial area 701. Accordingly, there is a need to skip combining processing. Thus, the system control unit 50 determines whether the area is an area in which image capturing has been performed once based on the movement amount. If the area is not the area in which image capturing has been performed once, the system control unit 50 determines that images can be combined. The clipped images 6b to 8b illustrated in FIG. 4 do not exceed the area in which image capturing has been previously performed. Accordingly, the system control unit 50 determines that images cannot be combined, where "x" is illustrated in each of the cells 6c to 8c to indicate that images cannot be combined.

If it is determined that images can be combined (YES in step S608), the processing proceeds to step S609. If it is determined that images cannot be combined (NO in step S608), the processing returns to step S603.

In step S609, the system control unit 50 calculates a movement amount (M2) based on the previous image and the current image. For example, if the second image is captured this time, the system control unit 50 calculates the movement amount based on the first image and the second image. In this case, to calculate the movement amount, the system control unit 50 detects edges within an image, extracts and samples a plurality of feature points, and calculates an affine coefficient. When a coordinate (x, y) is moved to a coordinate (x', y'), the affine coefficient is expressed by Expression (3) below using affine transformation:

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix}. \quad (3)$$

This 3×3 matrix is referred to as the affine coefficient. In the affine transformation, the affine coefficient can be calculated if at least three feature points are detected. For example, a feature point 1 is moved from a coordinate (x1, y1) to a coordinate (u1, v1), a feature point 2 is moved from a coordinate (x2, y2) to a coordinate (u2, v2), and a feature point 3 is moved from a coordinate (x3, y3) to a coordinate (u3, v3). Simultaneous equations based on Expression (3) can be obtained as Expressions (4) and (5) below:

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix}, \text{ and} \quad (4)$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix}. \quad (5)$$

The affine coefficient can be calculated by solving these equations. In this manner, the system control unit 50 detects the edges and extracts the feature points, thereby calculating the movement amount. If four or more feature points are extracted, a point close to another feature point is excluded, and the extracted points are normalized by a least-squares method. In a case where three feature points cannot be extracted or the extracted three feature points are located linearly, if two out of the three feature points are close to each other, it is determined that the calculation of the movement amount is unsuccessful.

If a difference between the movement amount (M2) calculated based on the image and the movement amount (M1) calculated based on the orientation information in step S607 is greater than or equal to a threshold and is largely different from each other, it is assumed that a repetitive pattern or a moving body is included in the image. Accordingly, if the difference between the movement amounts is greater than or equal to the threshold, the system control unit 50 may calculate the movement amount again based on the image under a different condition or may determine that the calculation of the movement amount is unsuccessful.

In step S610, the system control unit 50 performs alignment processing of images based on the movement amount (M2).

In step S611, the system control unit 50 determines whether alignment of images is successful based on the alignment processing. If the system control unit 50 determines that the alignment is successful (YES in step S611), the processing proceeds to step S612. If it is determined that the alignment is not successful (NO in step S611), the processing proceeds to step S614.

In step S612, the system control unit 50 combines the images subjected to the alignment processing based on the determination result as to whether the alignment is successful, thereby generating a composite image. More specifically, the system control unit 50 combines the image of the first partial area 701 in the first image with the image of the partial area 702 in the second image obtained after the alignment processing, thereby generating a composite image. FIG. 4 illustrates the composite image 3*d* obtained by combining the first clipped image 2*b* with the second clipped image 3*b*. For the third and subsequent images, the system control unit 50 combines the generated composite image with an image of the partial area 702 in the n-th (n>2) image obtained after the alignment processing, thereby generating a composite image. FIG. 4 illustrates the composite images 4*d*, 5*d*, 9*d*, 10*d*, and 11*d* obtained by combining the third and subsequent clipped images. In a case where an image includes a moving body such as a water surface, quality of a composite image may deteriorate. Accordingly, the system control unit 50 can improve the quality of the composite image by changing a composition ratio at a joining portion between images. After that, returning to step S603, if the image capturing instruction continues to be given, the system control unit 50 repeats the above-described processing, thereby generating a composite image. The system control unit 50 stores the generated composite image in the memory 207.

In step S604, if it is determined that the image capturing instruction does not continue to be given (NO in step S604), the processing proceeds to step S613. In step S613, the system control unit 50 compresses the generated composite image, and stores the compressed image as an image file in the recording medium 111. In this case, as indicated in the live view image 12*a* illustrated in FIG. 4, the system control unit 50 displays a message indicating that processing is being carried out during the compression and storage of the composite image. In the case of storing the composite image, the system control unit 50 may perform gamma correction to make a dark portion in the composite image easier to see or correction to unify color tones in the entire image. The compression processing can be omitted. The system control unit 50 may perform magnification of a size designated by the user in advance or may clip an image in a maximum inscribed rectangle or a predetermined area and store the clipped image. The composite image stored in this manner corresponds to a panoramic image. After that, the processing returns to step S302 illustrated in FIG. 3.

In step S603, if it is determined that the camera 100 is not panned in the predetermined direction (NO in step S603), or it is determined that the alignment is not successful in step S611 (NO in step S611), the processing proceeds to step S614. In step S614, the system control unit 50 stores the composite image obtained so far in the recording medium 111. The processing of step S614 is similar to the processing of step S613.

In step S615, the system control unit 50 displays, for the user, an error message indicating that the generation of the panoramic image has failed. More specifically, the system control unit 50 displays the error message indicating that the generation of the panoramic image has failed in such a manner that the message is superimposed on the live view image displayed on the display unit 101. After that, the processing returns to step S302 illustrated in FIG. 3.

Next, as described above, display of the guide frame 511 so that the user can recognize the guide frame 511 and non-display of the first partial area 701 and the second partial area 702 so that the user cannot recognize the first partial area 701 and the second partial area 702 will be described.

As described above, the combining processing is performed to generate a panoramic image. In the combining processing, areas in the vicinity of the edges of clipped images are used. Accordingly, it is not preferable that the face of a human figure be included in the vicinity of the edges of the clipped images. More specifically, it is difficult for a human to constantly maintain the same expression, and a small change in the expression tends to occur in a scene suitable for panoramic image capturing. Thus, if the face of a human figure whose expression has changed is included in the vicinity of the edges of clipped images, there is a possibility that the face may be distorted when the clipped images are combined.

Figure 7B:
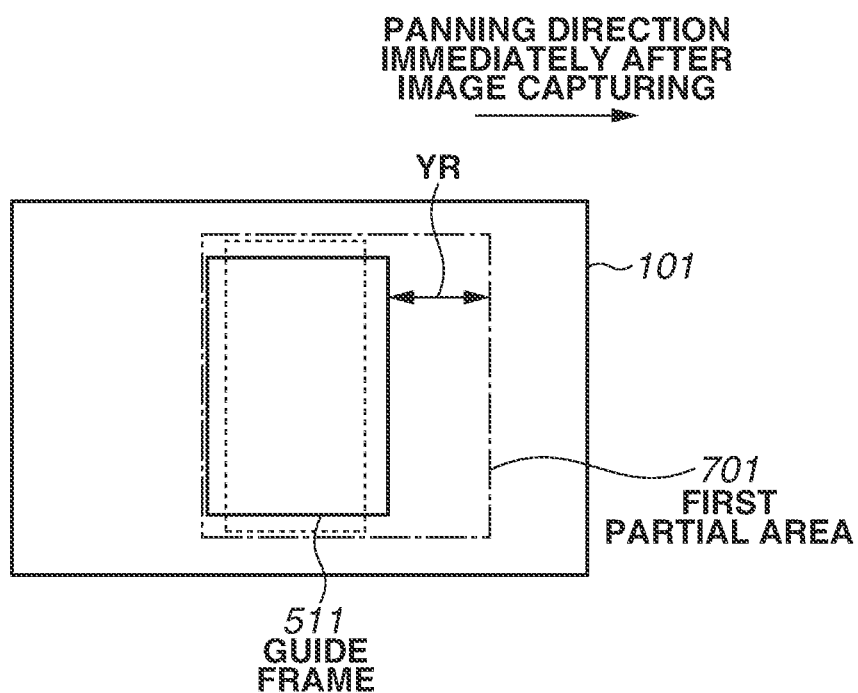

Accordingly, in the present exemplary embodiment, a guidance is displayed for the user to perform image capturing so that a human figure (in particular, the face) is located as close as possible to the center of a range to be clipped. More specifically, the guide frame 511 is displayed to be smaller than the first partial area 701 clipped from the actually captured image and to be included within the first partial area 701. The guide frame 511 is displayed at a fixed position unrelated to objects included in a live view image unlike a face detection frame and the like indicating a position where a face is detected. As illustrated in FIGS. 7A and 7B, the guide frame 511 does not include the edges of the live view image. Further, the guide frame 511 is set within an area (the first partial area 701) to be clipped to generate a panoramic image and does not include a joining portion of the area to be clipped (joining portion of the first partial area 701). In other words, the first partial area 701 is set so as to include the entire area of the guide frame 511. In this case, if the guide frame 511 is displayed so as to match the first partial area 701 (to match the joining portion), the user may locate the face of the human figure in the entire first partial area 701. In this case, the face is included in the vicinity of the edges of the clipped image.

In the present exemplary embodiment, the guide frame 511 is displayed so as to be included within the first partial area 701 without displaying the first partial area 701 that is an image to be actually clipped, thereby the user can issue the image capturing instruction in a state where the face of a human figure is located in the guide frame 511. Thus, when an image of the first partial area 701 is clipped, the face of the human figure is not included in the vicinity of the edges of the clipped image, so that the human figure can be captured more suitably in a panoramic image.

Furthermore, in the present exemplary embodiment, a setting for avoiding the face of a human figure from being included in the vicinity of the edges of the clipped image will be described.

First, as described above, the width W1 of the first partial area 701 is set to be larger than the width Wg of the guide frame 511 (W1>Wg). In other words, the width Wg of the guide frame 511 is smaller than the width W1 of the first partial area 701. By setting the guide frame 511 in this manner, it is possible to prompt the user to operate to include the face of a human figure within a range of the first partial area 701.

As described above, the value obtained by adding the blank width YL and the blank width YR in the width direction is greater than the value obtained by adding the blank width YU and the blank width YB in the height direction that is perpendicular to the width direction (YL+YR>YU+YB). In this case, a blank in the width direction is necessary to combine images to generate a composite image while a blank in the height direction is more or less unnecessary. As the blank in the height direction increases, the range of the guide frame 511 decreases, whereby it becomes difficult for the user to perform image capturing to include all faces of human figures within the guide frame 511 in a scene of panoramic image capturing of a plurality of human figures. For this reason, by setting the guide frame 511 as described above, it is possible to easily include the faces of the plurality of human figures within the guide frame 511.

Further, as described above, the width W1 of the first partial area 701 is larger than the width W2 of the second partial area 702 (W1>W2). In other words, the width W2 of the second partial area 702 is smaller than the width W1 of the first partial area 701. In the combining processing in which image capturing is performed to include the face of a human figure within the guide frame is terminated after capturing the first image, and subsequently, an image (background) is combined therewith, clipped images each having a small width are combined, thereby facilitating the alignment processing. Consequently, by the setting of partial areas as described above a panoramic image can be captured with no distortion.

As described above, in the present exemplary embodiment, the system control unit 50 displays the guide frame 511 as a guide indicating a predetermined area. Thus, the user is caused to issue an image capturing instruction in a state where a human figure is included within the guide frame 511. Then, the system control unit 50 combines the first partial area 701 including the entire area corresponding to the guide frame 511 of the image captured in a state where the human figure is included within the guide frame 511 with the second partial area 702 of an image other than the image described above. In this manner, it is possible to avoid a human figure, especially the face of a human figure, from being included within the vicinity of the edges of the first partial area 701, thereby it is possible to capture a panoramic image with a human figure more suitably without causing a distortion in the face of the human figure when the first partial area 701 is combined.

In the present exemplary embodiment, the first partial area 701 including the entire guide frame 511 is displayed when the first image is captured. Accordingly, the user can capture the first image while checking a state where a human figure is included within the guide frame 511. Thus, the human figure can be easily included within the guide frame 511 as compared with a case where the human figure is included within the guide frame 511 in the middle of a series of image capturing processes of the panoramic image capturing.

In the exemplary embodiment described above, a case where the first partial area 701 is set to be larger on both sides thereof in the width direction than the guide frame 511 is described, but the present disclosure is not limited to this case.

FIG. 7B illustrates a modification of the first partial area 701. In FIG. 7B, the first partial area 701 is set to be larger than the area corresponding to the guide frame 511 on one side thereof only along the width direction. More specifically, the first partial area 701 has no blank in the direction opposite to the panning direction immediately after image capturing, and the blank width YL is set to zero. On the other hand, when the panning direction is reversed, the blank width YR is set to zero.

In the present exemplary embodiment, the camera 100 is panned rightward immediately after the first image is captured. In the case of moving rightward, the blank width YR is necessary to combine the image with the subsequent image, but the blank width YL is not necessary to combine the image. In this manner, by minimizing the blank to be set, image processing can be speeded up, thereby a panoramic image can be rapidly generated.

In the exemplary embodiment, there is described an example where a series of image capturing processes in panoramic image capturing is performed while the image capturing instruction continues to be given, but the present disclosure is not limited to this example. The series of image capturing processes in panoramic image capturing can be started when a panoramic image capturing start instruction operation is performed, and can be terminated when a panoramic image capturing end instruction operation is performed or can be automatically terminated, for example, under a condition that an upper limit of the number of images that can be combined is reached.

The above-described various control operations that are performed by the system control unit 50 in the exemplary embodiment described above can be performed by one piece of hardware or can be shared among a plurality of pieces of hardware (e.g., a plurality of processors or circuits) to control the entire apparatus.

While the present disclosure has been described according to the exemplary embodiments, the present disclosure is not limited to these specific exemplary embodiments. Various modes within the scope not deviating from the gist of the present disclosure are also included in the present disclosure. Further, each of the exemplary embodiments described above is merely one exemplary embodiment of the present disclosure, and the exemplary embodiments can be combined as appropriate.

In the exemplary embodiments described above, an example where the present disclosure is applied to the camera 100 is described, but the present disclosure is not limited to this example. The present disclosure can be applied to any apparatus that includes an image capturing unit. More specifically, the present disclosure is applicable to a smartphone, a tablet terminal, a portable personal computer, a personal digital assistance (PDA), a portable image viewer, a digital photo frame, a music player, a game console, an electronic book reader, and the like.

In the apparatus such as a smartphone and a tablet terminal, if the apparatus includes a first image capturing unit that captures an image on a side of the display unit 101 and a second image capturing unit that captures an image on an opposite side of the display unit 101, the system control unit 50 determines that the camera 100 is in the self-image capturing state when the first image capturing unit that captures an image on the side of the display unit 101 is activated. In the case of a smartphone or a tablet terminal, the image capturing instruction can be issued by the user through a touch panel.

In the exemplary embodiments described above, an example where the camera 100 is panned rightward immediately after image capturing and then panned leftward is described, but the present disclosure is not limited to this example. The camera 100 can be panned leftward immediately after image capturing and then panned rightward. The swing direction in which the camera 100 is swung is not limited to the panning direction, and may be a direction perpendicular to the panning direction or any other direction.

In the exemplary embodiments described above, an example where the guide frame 511 is a display item that displays a guidance for the user to perform image capturing so as to include the face of a human figure within the guide frame 511. However, the present disclosure is not limited to this example. For example, the guide frame 511 can also be a display item that displays a guidance to perform image capturing so as to include any moving body other than a human figure within the guide frame 511.

In the exemplary embodiments described above, an example where the guide frame 511 is displayed when the camera 100 is in the self-image capturing state is described, but the present disclosure is not limited to this example. The guide frame 511 can be displayed when the panoramic image capturing mode is set.

According to the exemplary embodiments of the present disclosure, when panoramic image capturing that includes a moving body such as a human figure as an object is performed, it is possible to capture a panoramic image of the moving body more suitably.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-237200, filed Dec. 11, 2017, which is hereby incorporated by reference herein in its entirety.

What is claimed is:

1. An image capturing apparatus comprising:
an image sensor, and
a memory and at least one processor to perform operations of the following units:
a display control unit configured to control a display to display a live view image captured by the image sensor and a guide indicating a predetermined area being an area within the live view image, being located at a position unrelated to an object included in the live view image, including no edge of the live view image, and being located within an area to be clipped from a first image to generate a panoramic image but excluding a joining portion of the area to be clipped; and
a control unit configured to perform control to combine a first partial area including an entire area corresponding to the predetermined area in the first image among a plurality of images captured in a series of image capturing processes in panoramic image capturing with a plurality of partial areas among the plurality of images other than the first image to generate the panoramic image.

2. The image capturing apparatus according to claim 1, wherein the image sensor continuously captures an image while the image capturing apparatus is swung to perform the series of image capturing processes in the panoramic image capturing.

3. The image capturing apparatus according to claim 1, wherein the control unit performs control to generate the panoramic image using a plurality of images captured by the image sensor before an end of an image capturing instruction.

4. The image capturing apparatus according to claim 1, wherein the image sensor performs the series of image capturing processes in panoramic image capturing by continuously capturing an image corresponding to an operation in which the image capturing apparatus is swung in a first direction in response to an image capturing instruction, is then swung in a second direction opposite to the first direction, and is further swung in the second direction until at least passing an area where image capturing has been performed upon issuance of the image capturing instruction.

5. The image capturing apparatus according to claim 1, wherein the first image is an image captured first among the plurality of images.

6. The image capturing apparatus according to claim 1, wherein the guide indicating the predetermined area is a frame for prompting a user to perform image capturing by including a face of a human figure within the frame.

7. The image capturing apparatus according to claim 1, wherein the control unit performs control to set the first partial area to be larger than the predetermined area on both sides of the first partial area in a swing direction of the image capturing apparatus.

8. The image capturing apparatus according to claim 1, wherein the control unit performs control to set the first partial area to be larger than the predetermined area on one side of the first partial area along a swing direction of the image capturing apparatus.

9. The image capturing apparatus according to claim 1, wherein the control unit performs control to set the first partial area to be larger than the predetermined area in a swing direction of the image capturing apparatus and in a direction perpendicular to the swing direction, and to set a distance from an edge of the predetermined area to an edge of the first partial area in the swing direction to be longer than a distance from an edge of the predetermined area to an edge of the first partial area in the perpendicular direction.

10. The image capturing apparatus according to claim 1, wherein the control unit performs control to set a partial area in an image other than the first image to be smaller than the first partial area on both sides of the partial area in a swing direction of the image capturing apparatus.

11. The image capturing apparatus according to claim 1, wherein the display control unit performs control to display the guide indicating the predetermined area in a case where a panoramic image capturing mode that performs panoramic image capturing is set, and not to display the guide in a case where a second image capturing mode other than the panoramic image capturing mode is set.

12. The image capturing apparatus according to claim 1, wherein the display control unit performs control to display the guide in a case where a panoramic image capturing mode that performs the panoramic image capturing is set and the image capturing apparatus is in a state of capturing an image of a user himself or herself using the image sensor, and not to display the guide in a case where the image capturing apparatus is not in the state of capturing the image of the user himself or herself using the image sensor.

13. The image capturing apparatus according to claim 1, wherein the control unit performs control to combine, in a case where the guide is not displayed, a partial area narrower than the first partial area in the first image with a plurality of partial areas among the plurality of images other than the first image to generate the panoramic image.

14. The image capturing apparatus according to claim 1, wherein the display control unit performs control not to display the guide indicating the predetermined area after the first image is captured by the image sensor.

15. The image capturing apparatus according to claim 1, wherein the display control unit performs control not to display a range of the first partial area and a range of the partial areas in the plurality of images other than the first image.

16. The image capturing apparatus according to claim 1, wherein the control unit performs control, in a case where the image capturing apparatus is swung in a first direction in response to an image capturing instruction and is then swung in a second direction opposite to the first direction, and an area where image capturing has been performed when the image capturing apparatus is swung in the first direction is not passed, not to combine an image captured when the image capturing apparatus is swung in the second direction.

17. The image capturing apparatus according to claim 1, further comprising a determination unit configured to determine whether to combine an image of a partial area in an image other than the first image with images being combined,
wherein the control unit performs control to combine the image with the images based on a result of determination by the determination unit.

18. A control method for an image capturing apparatus, comprising:
capturing an image by an image sensor,
controlling a display to display a captured live view image and a guide indicating a predetermined area being an area within the live view image, being located at a position unrelated to an object included in the live view image, including no edge of the live view image, and being located within an area to be clipped from a first image to generate a panoramic image but excluding a joining portion of an area to be clipped, and
performing control to combine a first partial area including an entire area corresponding to the predetermined area in the first image among a plurality of images captured in a series of image capturing processes in panoramic image capturing with a plurality of partial areas among the plurality of images other than the first image to generate the panoramic image.

19. A non-transitory computer-readable recording medium that stores a program for causing a computer including an image sensor to function as each unit according to claim 1.

* * * * *